US009129302B2

(12) United States Patent
Glassman et al.

(10) Patent No.: US 9,129,302 B2
(45) Date of Patent: Sep. 8, 2015

(54) METHODS AND SYSTEMS FOR COUPON SERVICE APPLICATIONS

(75) Inventors: Ellen T. Glassman, Closter, NJ (US); Mark F. Schraad, Hoffman Estates, IL (US); Kevin M. Flowers, Chicago, IL (US); Yu Z. Chico, Los Altos, CA (US); Marisa L. McClearn, Chicago, IL (US); Daniel S. Grimm, Chicago, IL (US); Uki D. Lucas, Mundelein, IL (US); Christopher M. Munoz, Chicago, IL (US); Emil Gentolizo, Chesnee, SC (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 0 days.

(21) Appl. No.: 13/421,603

(22) Filed: Mar. 15, 2012
(Under 37 CFR 1.47)

(65) Prior Publication Data
US 2013/0117106 A1 May 9, 2013

Related U.S. Application Data

(60) Provisional application No. 61/453,770, filed on Mar. 17, 2011.

(51) Int. Cl.
*G06Q 30/00* (2012.01)
*G06Q 30/02* (2012.01)
(Continued)

(52) U.S. Cl.
CPC .......... *G06Q 30/0255* (2013.01); *F25D 29/008* (2013.01); *G06Q 30/0223* (2013.01); *G06Q 30/0224* (2013.01); *G06Q 30/0235* (2013.01); *G06Q 30/0633* (2013.01)

(58) Field of Classification Search
USPC ....................................... 705/14.25
See application file for complete search history.

(56) References Cited

U.S. PATENT DOCUMENTS

| 4,323,773 A | 4/1982 | Carpenter |
| 4,503,502 A | 3/1985 | Chapin |
| 6,137,095 A | 10/2000 | Kashimoto |

(Continued)

OTHER PUBLICATIONS

Canadian Patent Office, Office action in Canadian Patent Application No. 2,771,471, dated Jan. 24, 2014. (4 pages).

(Continued)

*Primary Examiner* — John G Weiss
*Assistant Examiner* — Scott C Anderson
(74) *Attorney, Agent, or Firm* — McAndrews, Held & Malloy, Ltd.

(57) ABSTRACT

A coupon service application operated on multiple platforms, including mobile devices, PC/Internet and display screens on home appliances. The application maintains a home inventory defining the consumable products within a user's home and a shopping list defining the consumable products the user wishes to purchase, and compares the home inventory and shopping list against a database of available coupons. Users can share and save coupons, use coupons for online purchases, check their home inventory while away from home, monitor the price of certain products and compare the price against an average price and track historical savings. The application maintains a recipe bank, suggests recipes based on the home inventory, and enables users to select recipes, adding ingredients therefrom to the shopping list, all while identifying coupons for items on the shopping list and the home inventory. Users can input a budget, and tracks spending against the budget.

20 Claims, 11 Drawing Sheets

(51) Int. Cl.
*F25D 29/00* (2006.01)
*G06Q 30/06* (2012.01)

(56) References Cited

U.S. PATENT DOCUMENTS

| | | | |
|---|---|---|---|
| 6,486,453 B1 | 11/2002 | Bales | |
| 6,549,818 B1 | 4/2003 | Ali | |
| 6,936,802 B2 | 8/2005 | Ishikawa | |
| 6,953,342 B2 | 10/2005 | Bisogno | |
| 7,249,708 B2 | 7/2007 | McConnell | |
| 7,907,054 B1* | 3/2011 | Nguyen | 340/572.1 |
| 8,051,381 B2 | 11/2011 | Ebrom | |
| 8,276,505 B2 | 10/2012 | Buehler | |
| 2001/0010032 A1 | 7/2001 | Ehlers | |
| 2002/0065693 A1* | 5/2002 | Hattori et al. | 705/7 |
| 2002/0097851 A1 | 7/2002 | Daum | |
| 2002/0120534 A1 | 8/2002 | Howard | |
| 2003/0080113 A1 | 5/2003 | Williamson | |
| 2003/0083770 A1 | 5/2003 | Williamson | |
| 2003/0139975 A1* | 7/2003 | Perkowski | 705/26 |
| 2004/0083474 A1 | 4/2004 | McKinlay et al. | |
| 2005/0131761 A1* | 6/2005 | Trika et al. | 705/14 |
| 2005/0160005 A1 | 7/2005 | Roth | |
| 2005/0273345 A1 | 12/2005 | Castillejo | |
| 2007/0094090 A1 | 4/2007 | Jenkins | |
| 2007/0129812 A1 | 6/2007 | Ferchau | |
| 2007/0141540 A1 | 6/2007 | Borg | |
| 2007/0143126 A1 | 6/2007 | Ghose | |
| 2008/0064395 A1 | 3/2008 | Sibileau | |
| 2009/0030829 A1* | 1/2009 | Chatter et al. | 705/37 |
| 2009/0040067 A1 | 2/2009 | McCoy | |
| 2009/0087819 A1 | 4/2009 | Adachi | |
| 2009/0292591 A1* | 11/2009 | Schultz et al. | 705/10 |
| 2009/0299849 A1* | 12/2009 | Cao et al. | 705/14.39 |
| 2010/0030578 A1* | 2/2010 | Siddique et al. | 705/3 |
| 2010/0085144 A1 | 4/2010 | Alsa | |
| 2010/0094475 A1 | 4/2010 | Masters | |
| 2010/0121807 A1 | 5/2010 | Perrier | |
| 2010/0182136 A1 | 7/2010 | Pryor | |
| 2010/0231506 A1 | 9/2010 | Pryor | |
| 2010/0299600 A1 | 11/2010 | Archer | |
| 2010/0313768 A1 | 12/2010 | Koether | |
| 2011/0167100 A1 | 7/2011 | Brodowski | |
| 2012/0171646 A1 | 7/2012 | Chen | |
| 2012/0179665 A1 | 7/2012 | Baarman | |
| 2012/0260683 A1 | 10/2012 | Cheon | |
| 2013/0052616 A1 | 2/2013 | Silverstein | |
| 2013/0073690 A1 | 3/2013 | DeSalvo | |

OTHER PUBLICATIONS

Canadian Patent Office, Office action in Canadian Patent Application No. 2,771,745, dated Jan. 28, 2014. (5 pages).
Canadian Patent Office, Office action in Canadian Patent Application No. 2,771,743, dated Jan. 31, 2014. (5 pages).
Canadian Patent Office, Office action in Canadian Patent Application No. 2,771,471, dated Aug. 26, 2014. (3 pages).

* cited by examiner

FIG. 7D Coupon Results
FIG. 7E No Results Found
Retrieving Results
FIG. 7B  FIG. 7C
Scan Product
FIG. 7A

Bump Coupon

FIG. 10B

Share options

FIG. 10A

Select Share Coupon

METHODS AND SYSTEMS FOR COUPON SERVICE APPLICATIONS

CROSS REFERENCE TO RELATED APPLICATIONS

This application is a non-provisional application claiming priority from U.S. Provisional Application Ser. No. 61/453,770, filed Mar. 17, 2011, entitled "Coupon Service App for Mobile Devices, Internet, Home Hub Portal, PC, TV and Major Appliance Display Screens Including Laundry, Dishwasher, Refrigerator, Oven Displays."

This application is related to U.S. patent application Ser. No. 13/421,423 entitled "Methods and Systems For Appliance Community Service Management," filed Mar. 15, 2012, and U.S. patent application Ser. No. 13/421,499 entitled "Methods and Systems for Device Management with Sharing and Programming Capabilities," filed Mar. 15, 2012.

All of the above-cited applications are incorporated herein by reference in their entirety.

FIELD OF THE DISCLOSURE

The present disclosure generally relates to monitoring a user's purchasing histories, inventories and favorite brands for the purpose of presenting users with coupons for savings on future purchases, and more particularly to methods and systems for coupon service applications.

BACKGROUND

Technological advances have introduced a new level of connectivity to our society, allowing users to monitor and direct many aspects of their lives remotely. Household devices are typically stand-alone devices, and they are usually not connected to a broader network which may include other appliances and devices. Providing wireless management, sharing and programming capabilities allow users to communicate remotely with their devices, and thus exploit their devices more effectively and efficiently.

DETAILED DESCRIPTION

The following description of example methods and apparatus is not intended to limit the scope of the description to the precise form or forms detailed herein. Instead, the following description is intended to be illustrative so that others may follow its teachings.

Example methods and systems for providing device management with sharing and programming capabilities are disclosed herein. In general, the disclosed examples allow for the management through the monitoring and/or controlling of enabled household devices. This way, users may retrieve information and interact with their household devices remotely. Moreover, users may use information retrieved from their household devices in other applications, such as shopping, social networking, scheduling, food preparation, budget management, accounting, tax-preparation, etc.

Figure 1:
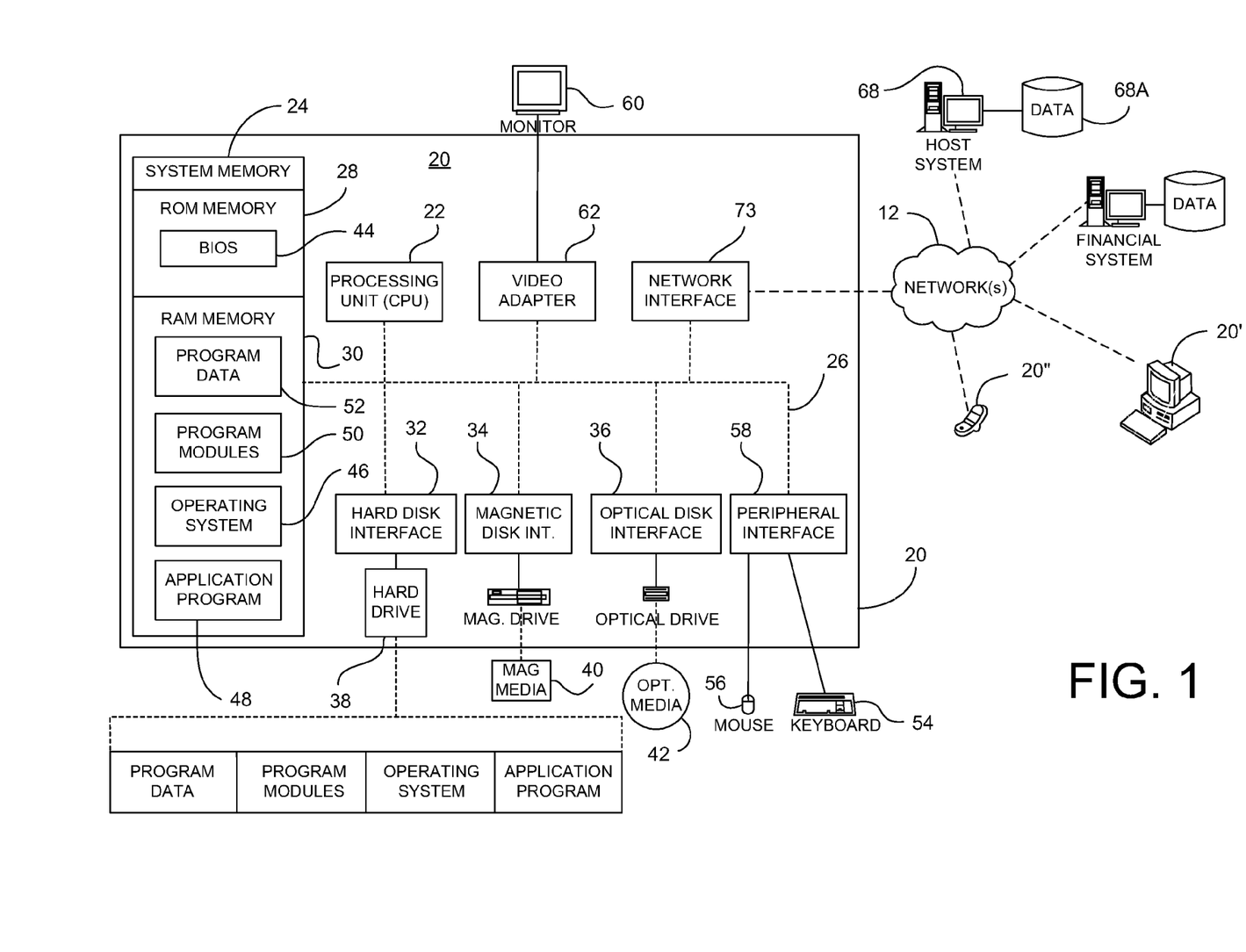
FIG. 1 illustrates, in block diagram form, components of an example computer network environment suitable for implementing the example household device management system.

With reference to the figures, the following disclose various example systems and methods for providing home device management. To this end, FIG. 1 illustrates a processing device 20, illustrated in the exemplary form of a mobile communication device, a processing device 20', illustrated in the exemplary form of a computer system, and a processing device 20 illustrated in schematic form, such as, for example, an appliance is provided with executable instructions to provide a means for a customer, e.g., a user, consumer, etc., to interact with the device 20 and/or to access a host system server 68. Generally, the computer executable instructions reside in program modules which may include routines, programs, objects, components, data structures; etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a home appliance, a personal computer, mainframe computer, personal-digital assistant ("PDA"), cellular telephone, tablet, e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read-only memory (ROM) 28 and/or random-access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random-access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer-executable instructions comprising an operating system 46, one or more applications programs 48 (such as a Web browser), other program modules 50, and/or program data 52. Still further, computer-executable instructions may be downloaded to one or more of the computing devices as needed via a network connection, for example.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices not shown, such as, for example, speakers, cameras, printers, or another suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, receiving information regarding at least one appliance's energy usage, receiving information regarding the operation of the smart grid, and providing a scheduling service to coordinate the use of the appliance.

Communications between the processing device 20 and the host system server 68 may be exchanged via a further processing device, such as a network router (not shown) that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
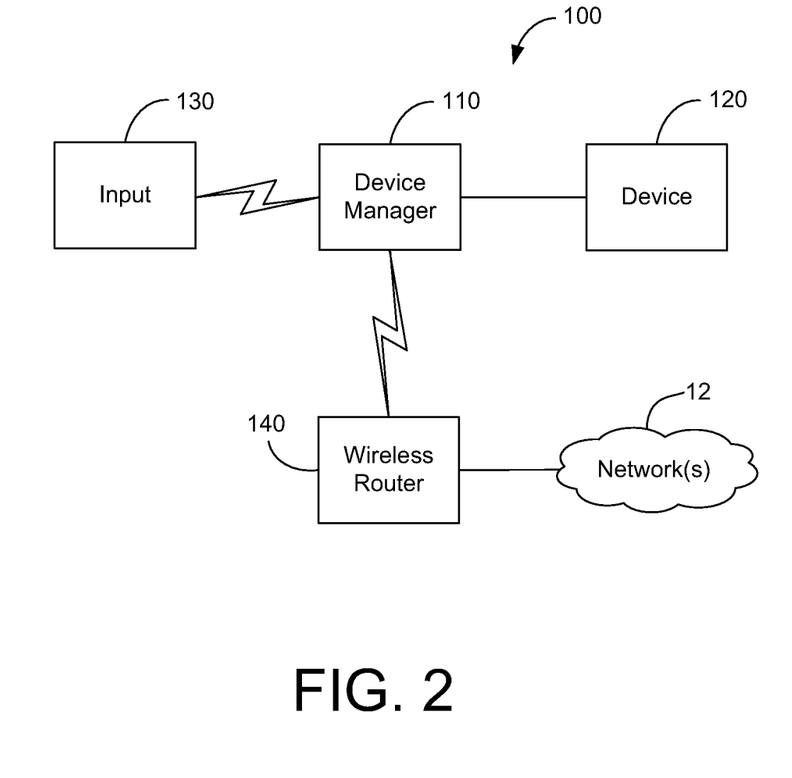
FIG. 2 is a system diagram of an example device management system.

FIG. 2 illustrates an example device management system 100 in accordance with one example of the present disclosure. In this example, the system 100 comprises a device manager 110 in communication with at least one device, such as a household device 120. The device manager 110 may be a computer program, mobile app, website, database, or any other appropriate electronic format. The device manager 110 may be displayed on an electronic device, such as, for example, a personal computer, a mobile device, a cellular phone, a personal digital assistant (PDA), a retail kiosk, and/or a physical medium using, such as, for example, the Internet, an internal network, or a social network. While in this example the device manager is illustrated as being . . . , it will be appreciated by one of ordinary skill in the art that the device manager 110 may be internal and/or external, integrated with the appliance 120, another device, and/or the server 68 or other peripheral devices.

The appliance 120 may be any household appliance such as a refrigerator and/or freezer unit, oven, microwave, pantry, slow cooker; bread machine, dishwasher, washing machine, dryer, tool chest, home entertainment system, television, coffee maker, etc. It will be understood that there are many other devices and/or appliances that may be used with the device manager 110 without departing from the spirit of the present disclosure. Furthermore, although the presently described embodiment comprises one device 120 in communication with device manager 110, it will be understood by one of ordinary skill in the art that a plurality of devices, such as the appliance 120 described in this example, may be in communication with the device manager.

The device manager 110 may be in communication with device 120 via Internet, LAN, MAN, WAN, cellular network, cloud network, enterprise network, virtual private network, wired and/or wireless network, Bluetooth, infrared, or other suitable network. In one example of the disclosure, the device, such as a household appliance 120, may communicate information such as the status of the household appliance 120, the contents of the household appliance 120, the age of the household appliance 120, the condition of the household appliance's 120 contents, the condition of the household appliance's 120 component's, etc.

For example, in one embodiment of the present disclosure, the household appliance 120 may be a refrigerator and/or freezer unit, and the household appliance 120 may communicate information such as the temperature of the refrigerator and freezer unit, food items contained in the refrigerator and freezer unit, the purchase date of the food items, the "best-by" date of the food items, the quantity of the food items, the purchase price of the food item, and/or any other relevant information.

In another example of the present disclosure, the household appliance 120 may be an oven, and in that example the household appliance 120 may communicate information such as the temperature of the oven, the oven time, etc. In another embodiment of the present disclosure, the household appliance 120 may be a dishwasher and in that embodiment the household appliance 120 may communicate the contents of the dishwasher, the status of the contents, the cycle that the dishwasher is in, etc.

In the embodiment shown in FIG. 2, the device manager 110 is in communication with a wireless router 140. The device manager 110 may transmit the information received from the device 120 to the wireless router 140 which in turn transmits the information to the host system server 68, or other suitable service, such as a cloud service through the network 12, including an Internet, cellular, wireless, wired, LAN, tethered, and/or any other suitable connection.

In one disclosed example the device manager 110 may also receive certain inputs 130, that the device manager 110 uses in coordination with the information received from the appliance 120. These inputs 130 may be, for example, images retrieved from a user's camera, information received from a UPC scanner, a user's location information, information received an organization, text messages received by a user, emails received by a user, weather information, social updates received by a user, etc. The inputs 130 may originate from a camera or a microphone or any other peripheral coupled to the peripheral interface 58 of the device 20.

In one example of the present disclosure, the device 120 is a refrigerator and/or freezer unit. In that example, the device manager 110 allows the user to monitor and control the refrigerator and/or freezer and access a list of the contents thereof, using information from the device 110 as well as other inputs 130. For example, the device manager 110 may monitor and control the temperature of the refrigerator freezer unit.

In another aspect of the present disclosure, the device manager 110 may compile a home inventory of goods contained in the refrigerator and/or freezer unit and store the contents of the home inventory on the hard drive 38 or as data 68A on the host server 68. The home inventory allows the user to remotely monitor the contents of the refrigerator and freezer unit, or the contents of any other device coupled to the network 12. The home inventory may be a contemporaneous snapshot of the user's current refrigerator and freezer contents, and enables users to make decisions on the go regarding what the family will eat for dinner that evening, whether certain additional food items or ingredients need to be purchased, and whether any available coupons could be used to save money in the purchase of those food items or ingredients.

The device manager 110 may also monitor and save the user's home inventory history to determine and monitor the items that a user historically keeps in the refrigerator and freezer unit. The device manager 110 may use the home inventory in conjunction with inputs 130 such as a recipe database, a retail organization's catalog, universal product codes scanned from the retail location, nutritional information database, information from a user's social network, etc. The device manager 110 may use the home inventory to develop recipe suggestions, develop purchase suggestions, analyze usage statistics, develop a nutritional and/or diet plan, sync to a user's calendar, share information on a social network, etc.

In one aspect of the present disclosure, the device manager 110 may use a home inventory to develop a shopping list of items using information received from the refrigerator and freezer unit, such as the home inventory, the quantity of food items and the status of those items. The device manager 110 may use a user's home inventory history to develop suggestions for users to put on the shopping list. The device manager 110 may also use inputs 130 such as, for example, inputs from a camera or a UPC scanner taken at a retail location, to add or remove items to a home inventory, and to add or remove items from a shopping list.

In another aspect of the present disclosure the device manager 110 may compile a list of a user's preferred items. For example, the device manager 110 may use a user's home inventory history to determine a user's preferred items. In another example, the device manager 110 may determine a user's preferred items based on food group, seasonality, origin, brand, nutritional information, allergy information, etc. In another example, the user may add or remove preferred items to the list compiled by the device manager 110.

In another aspect of the present disclosure the device manager 110 may allow a user to organize his home inventory, for example, based on preferred items, special dietary foods, holiday foods, nutritional information, seasonality, weight loss, family member preferences, etc.

In another aspect of the present disclosure the device manager 110 may use inputs 130 from a user's calendar. For example, the user's calendar may contain menu plans, social engagements, weight loss plans, nutritional information, etc. The device manager 110 may, for example, suggest purchases of certain items based on the ingredients needed for an upcoming menu plan, a visitor with certain dietary restrictions, and/or a user's weight loss and/or nutritional goals. The device manager 110 may also use a user's calendar in order to set up future social engagements, coordinate shared purchases, plan community events, coordinate shopping events, etc. The device manager 110 may distribute invitations, and facilitate group chats, group voting, group messaging etc. In one specific example the device manager 110 may extend a picnic invitation to a number of additional users and each additional user may respond with the items that they are bringing.

In another aspect of the present disclosure the device manager 110 may use the home inventory and/or a user's historical home inventory to set recurring orders for certain items. In another aspect of the present disclosure, the device manager 110 may sync with a tax preparation application in order to determine and track which items are tax deductible.

In another aspect of the present disclosure the device manager 110 may use the home inventory to generate and suggest coupons and/or retail offers from a retail organization. The device manager 110 may receive inputs 130 from a retail organization about coupons or other retail offers that are currently available. The device manager 110 may then use the inputs 130 received from the retail organization in combination with the home inventory and/or a user's home inventory history to develop and/or suggest retail offers. For example, the device manager 110 may suggest a retail offer for items that a user is low on, an item that complements a user's home inventory, an item on a user's preferred item list and/or an item from a user's shopping list. In another example, device manager 110 may suggest a coupon or retail offer from an alternative brand as compared to the brand that a user currently possesses, and/or a brand that is currently on a user's preferred item list.

In another aspect of the present disclosure, the device manager 110 may also redeem coupons or other retail offers received from a retail organization. For example, the device manager 110 may operate on a cellular phone, tablet, computer, laptop, PDA etc. and a user may use the device manager 110 to redeem retail offers when online shopping, and/or during in-store purchases.

In another aspect of the present disclosure the device manager 110 may monitor the prices of certain items using information received from one or more retail organizations. The device manager 110 may monitor the sales prices of items such as a user's preferred item and/or items on a user's shopping list, and alert the user when the item reaches a certain sales price. The device manager 110 may also track historical price information for certain items, such as the average local price, the price trend, the seasonal average price, the current price as compared to the average price, etc.

In another aspect of the present disclosure the device manager 110 may allow a user to browse through coupons using motion activation, voice command, hand gestures etc. In another aspect of the present disclosure the device manager 110 allows a user to share coupons through email, social networks, wireless networks, directly between cellular phones, Bluetooth, LAN, etc.

In another aspect of the present disclosure, the device manager 110 may develop and suggest instructions sets. For example, if the device 120 is a tool chest, the instruction set may be instructions for building a certain object. For example, if the device 120 is a home entertainment system, the instruction, set may be a music playlist and/or settings for an audio entertainment system.

If, for example, the device 120 is a refrigerator and freezer unit, the instruction set may be a recipe. In that example, the device manager 110 may suggest recipes based on, for example, the items currently on a user's home inventory, a user's personal preferences, a user's stated preferences, and categories such as cuisine type, seasonality, occasion, ratings, popularity, nutritional information, allergy information, etc. The device manager 110 may also allow users to input recipes, for example by selecting existing recipes from online databases, manually inputting recipes, inputting recipes using a digital scanner, capturing a recipe using a camera, etc.

In another aspect of the present disclosure, the device manager 110 may use a recipe to automatically add and/or suggest items for a user's shopping list. The device manager 110 may also suggest side dishes, desserts, beverage accompaniments, etc. based on a user's selected recipes, home inventory, shopping list, available retail offers, calendar, social network updates, etc. In another aspect of the present disclosure, the device manager 110 may use inputs 130 such as information received from a UPC scanner, and/or a camera identifying an items) at a retail location. The device manager 110 may use the item identified to suggest recipes based on the home inventory.

In another embodiment of the present disclosure, the device manager 110 may receive information and commands from multiple users. For example, the device manager 110 may access calendars for multiple users for the purposes of meal planning, holiday planning, birthday planning, schedule coordination, and other multi-user events. The device manager 110 may allow users to select recipes, shopping list items, home inventory, online wish list items, etc. for certain calendar events. In addition, the users may use the device manager 110 to schedule social activities at public venues, such as restaurants, theme parks, movie theatres, entertainment centers, shopping malls, etc. and the device manager 110 will automatically search for coupons for those venues. In another aspect of the present disclosure, the users may ask the device manager 110 for suggestions for social activities and/or public venues by inputting information such as user preferences, retail offers, locational data, etc.

In another aspect of the present disclosure the device manager 110 may make an home inventory of items based on their location, for example, kitchen, living room, dining room, laundry room, bed room, garage, workshop, home office, etc. In another aspect of the present disclosure the device manager 110 may allow users to organize items in a home inventory based on where they are purchased.

In another aspect of the present disclosure the device manager 110 may be used for budgeting purposes. For example, the device manager 110 may receive inputs 130 from the user such as weekly, daily, monthly, or yearly budgeting goals. The budgeting goals may be further divided based on category of spending, calendar events, type of items purchased etc. The device manager 110 may track spending based on items on a device's home inventory, and/or items on a user's shopping list. The device manager 110 may also provide budgeting information based on information retrieved from retailers, such as price information and retail offers. Additionally, the device manager 110 may track a user's savings based on his or her purchase history, home inventory, shopping list and/or information about retail offers. The device manager 110 may also track historical budgeting, expenditure, and savings information. The device manager 110 may also use locational data to identify item prices at retail locations both in-store and online.

In another aspect of the present disclosure, the device manager 110 may allow a user to communicate and connect with additional users. For example, the device manager 110 may allow a plurality of users to participate in group buying for volume discounts. In another aspect of the present disclosure, the device manager 110 may allow users to send alerts, messages, reminders, etc. to users regarding items on their home inventory, items on their shopping list, retail offers, device status, recipes etc. The device manager 110 may also allow users to post information and/or updates on social networking sites regarding items on their home inventory, items on their shopping list, retail offers, device status, recipes, etc. The device manager 110 may also be used for gaming purposes, for example, allowing users to participate in a game tracking their purchases, competing for retail offers, etc.

In another aspect of the present disclosure, the device manager 110 allows users to customize their privacy settings to determine the amount and nature of information to share with the device manager, other users, social networks, retail organizations, etc.

In another aspect of the present disclosure, the device manager 110 may be used to control settings on the device 120. For example, if the device 120 is a refrigerator and freezer unit, the device manager 110 may remotely control the temperature of the device. In another example, if the device 120 is an oven, the device manager 110 may remotely turn the oven on for pre-heating purpose, and/or remotely turn the oven off. If the device 120 is a dishwasher, the device manager 110 may remotely turn the dishwasher on, or change the dishwasher's settings at the user's command.

The device management system 100 of the present disclosure may give and respond to voice commands. For example, the inputs 130 may be in the form of vocal commands from a user. In another aspect of the present disclosure, the device manager 110 may communicate reminders, alerts, and instructions via audible commands. For example, the device manager 110 may read a selected recipe, notify users of the home inventory, notify users of items on a shopping list, notify users of retail offers, notify users of a device's status, etc.

The device manager 110 of the present disclosure may be displayed and/or formatted in HTML, JSON, XML and/or any other appropriate format.

Figure 3:
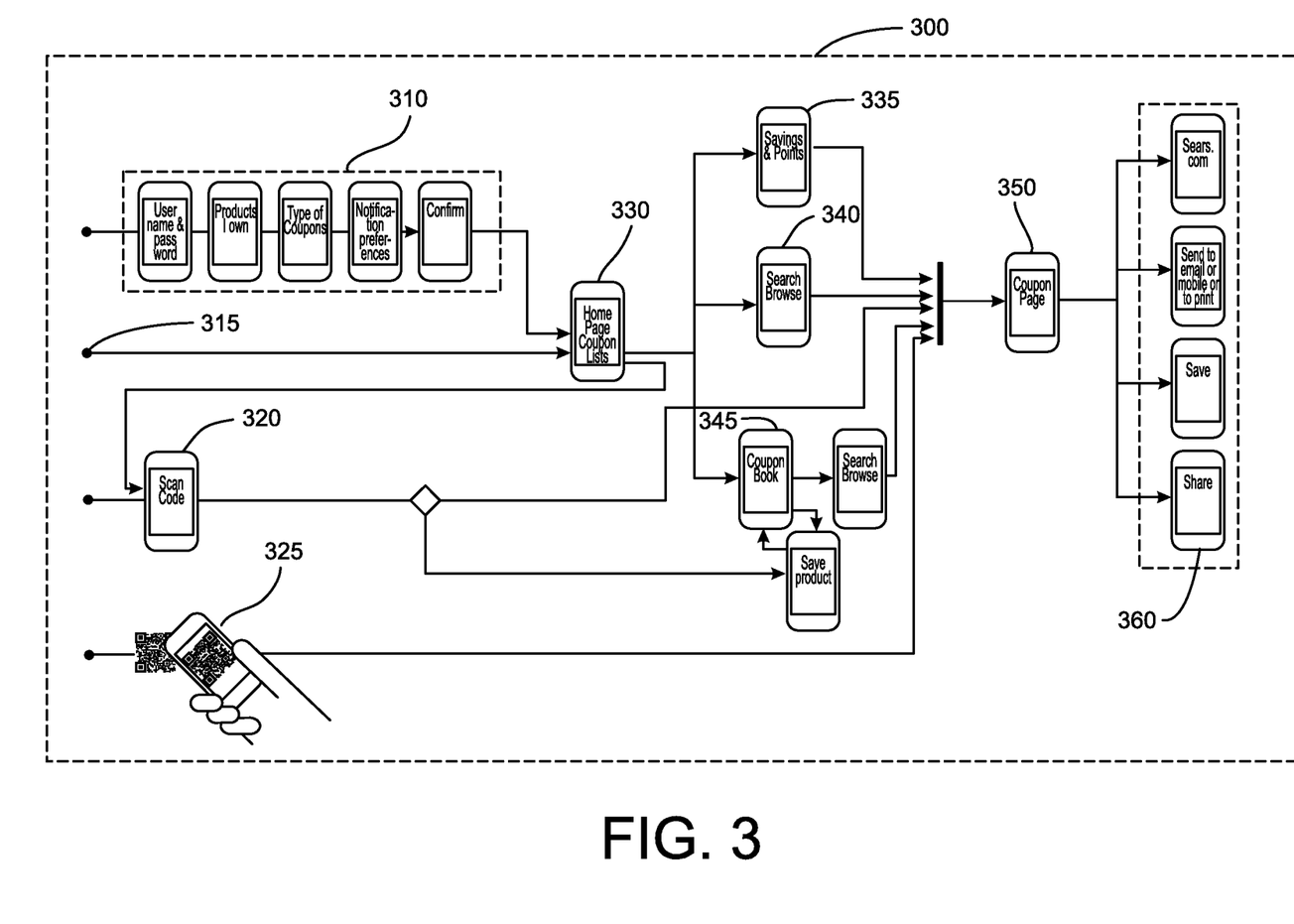
FIGS. 3-5 are system diagrams depicting the coupon service application as it appears on mobile phones, PCs/the Internet, and an LCD appliance display, respectively.

FIG. 3 depicts a system diagram 300 for a mobile application. Once a user has downloaded the application at step 310, the user can enter the home page through one of several methods: (1) opening the application and signing in as a registered user, step 315; (2) scanning a universal product code, step 320; or (3) scanning a QR (Quick Response) Code, step 325. The user then either views a coupon 350, or is taken to a homepage 330, where the user is given the choice to view notifications 335, find coupons 340, or view their coupon book 345. From viewing a coupon 350, the user can choose one of several options at step 360, including redeeming the coupon at an online retail store, sending the coupon through email or text/MMS, sharing the coupon via social media, or save the coupon in their coupon book.

Once a user downloads the app and a registered user logs in, the app begins at a homepage/coupon list. The homepage may include links to notifications of newly-identified coupons, a user's book of saved coupons, as well as the ability for users to search for coupons using both text searching and universal product code scanning. Once a user chooses a coupon to be viewed, the coupon can be (1) used in connection with a purchase performed through the mobile device, (2) saved to the user's coupon book; or (3) shared with friends via social networking sites, email, MMS, or through "bumping" mobile devices.

Figure 4:
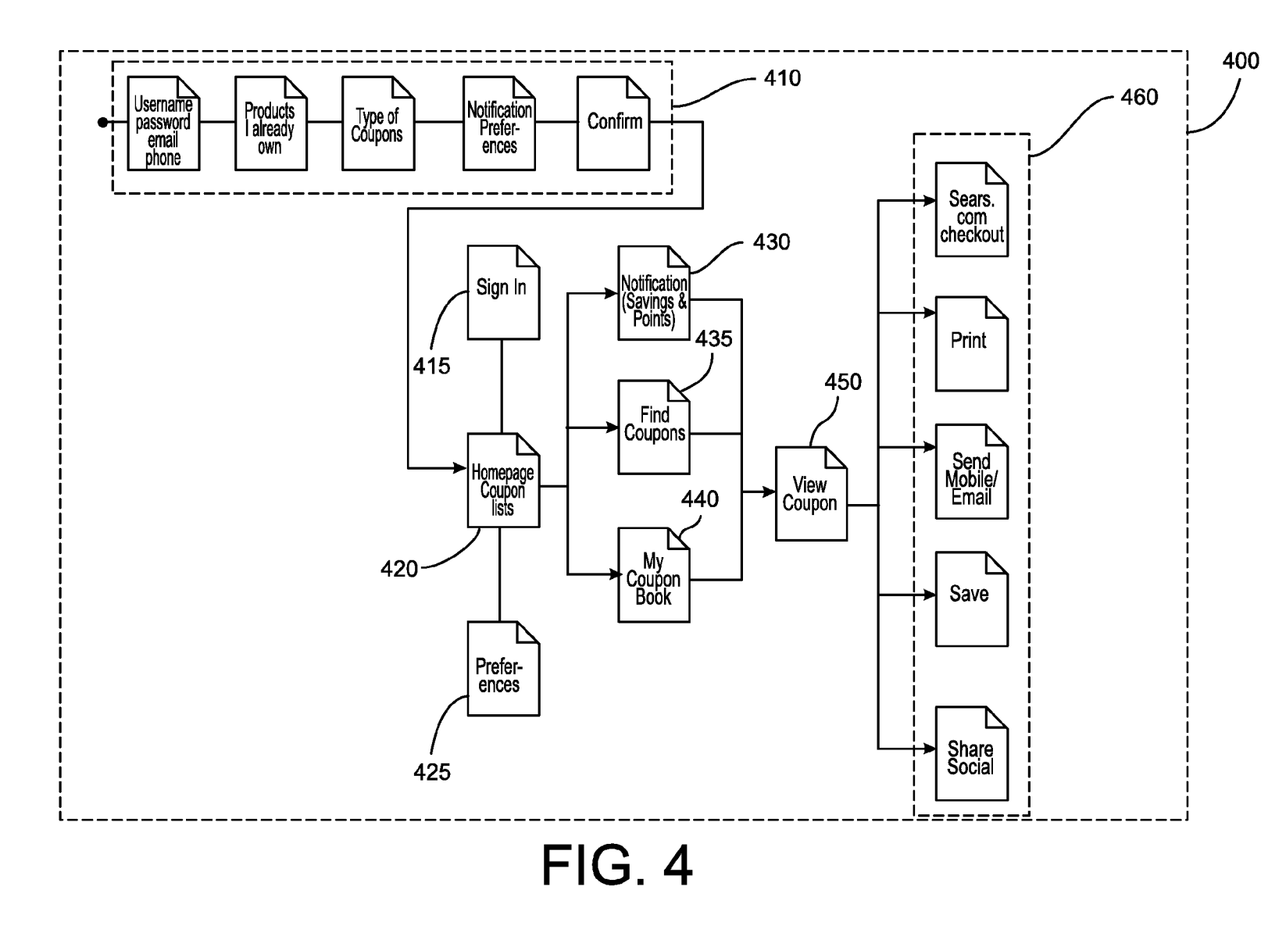

FIG. 4 depicts a system diagram 400 for using the coupon service application on the Internet through a PC. Once a user completes the registration process 410, or a user signs into a previously created account at step 415, the user is taken to a homepage 420. From the homepage 420, the user can change user preferences 425, view notifications 430, find coupons 435, or view their coupon book 440. Each of those steps enables a user to view a coupon 450 and from there, the user can choose one of several options at step 460, including redeeming the coupon at an online retail store, printing the coupon, sending the coupon through email or text/MMS, sharing the coupon via social media, or saving the coupon in their coupon book.

Figure 5:
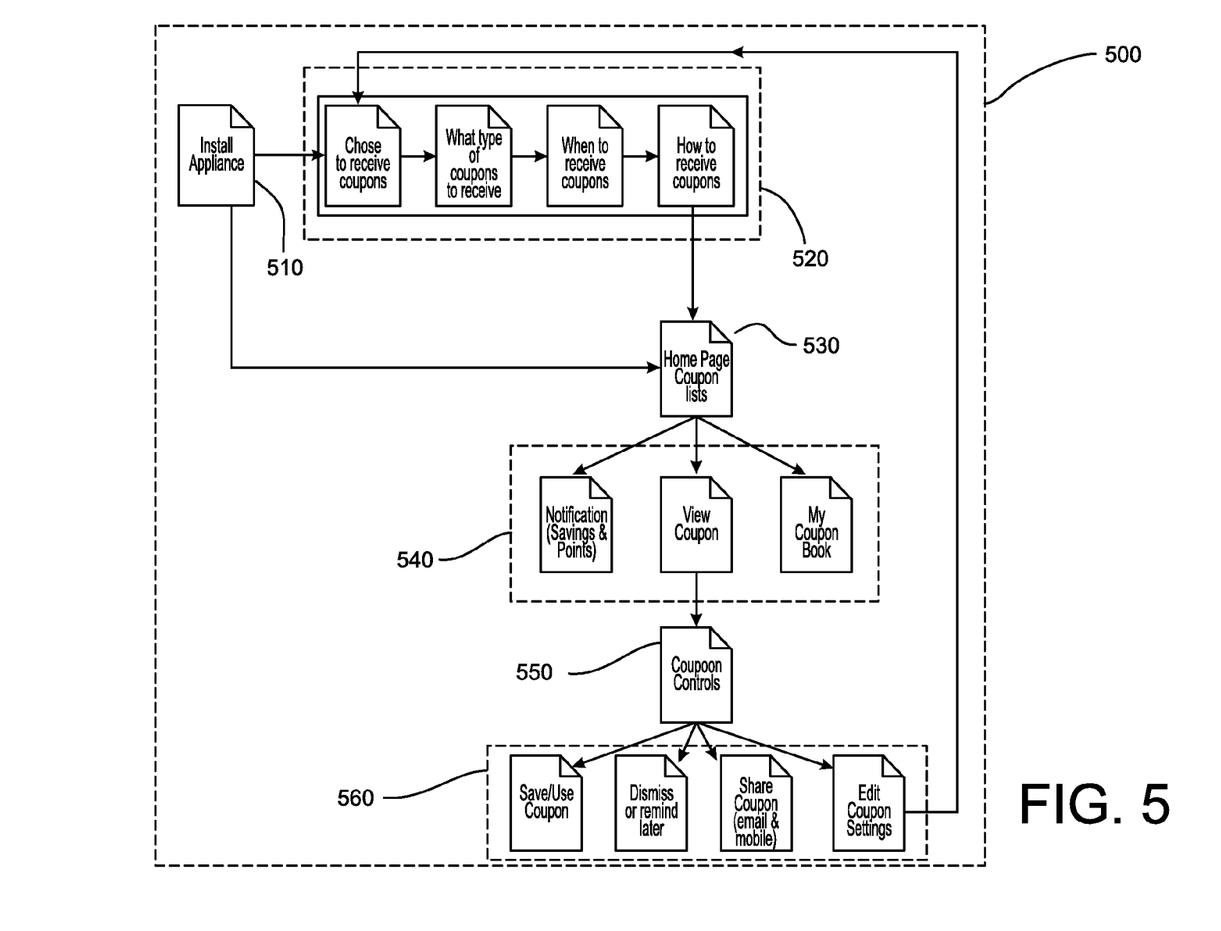

Referring to FIG. 5, a system diagram 500 for using the coupon service application through a home appliance display screen is depicted. Once a user has installed the appliance 510, the user is prompted for coupon preferences at step 520. From then on, the user starts the appliance application at the homepage 530, where the user can choose to view notifications, find and view coupons, and browse their coupon book at step 540. After viewing a coupon 550, the user may choose from a variety of coupon controls at 560, which enable the user to dismiss, save or use the coupon, share the coupon via email and/or text/MMS, or edit the user's coupon preferences back to step 520.

Figure 6:
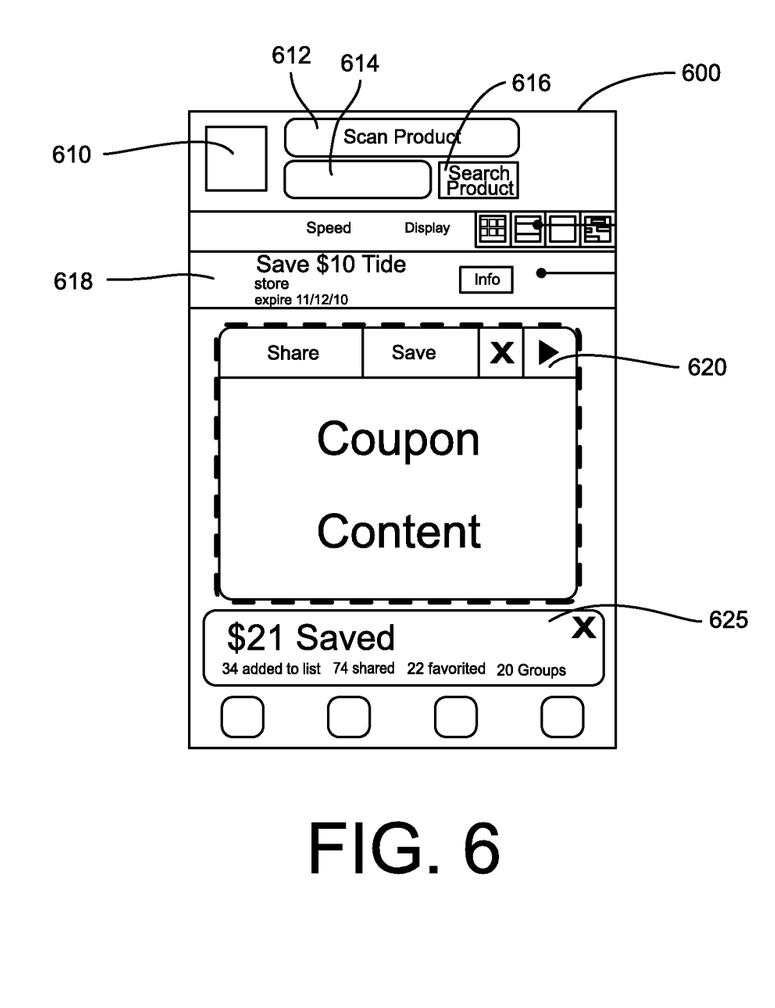
FIG. 6 depicts the coupon service application as it appears on a mobile device.

FIG. 6 shows the display screen 600 of the coupon service application as it would appear on a mobile device. Using the buttons displayed on the top banner 610, users can search for available coupons or products, either by selecting the top button 612, which will activate the mobile device's camera for scanning a universal product code, or by entering text into the search box 614, and selecting the "Search Product" button 616. Immediately below the top banner 610, a group of icons enables users to vary the display and speed of coupons shown, followed directly below by a panel 618 showing the coupon's identifying information: the title of the coupon, the store and location where it can be used, and the expiration date, if any. The majority of the screen depicts the coupon's content, with a small banner 620 thereabove which shows the primary coupon actions, including (1) "Share," which allows users to share the coupon via email, MMS, social media, or directly between mobile devices; (2) "Save," which allows users to save the coupon in their book of saved coupons, (3) "X," which allows a user to close and bypass an undesired coupon, and (4) a right arrow, which allows a user to utilize the coupon immediately by purchasing the item online through the mobile application, a related application, or the World Wide Web. Below the coupon content is a Savings Tabulator 625, which displays the user's savings for coupons which have been used.

Figure 7A:
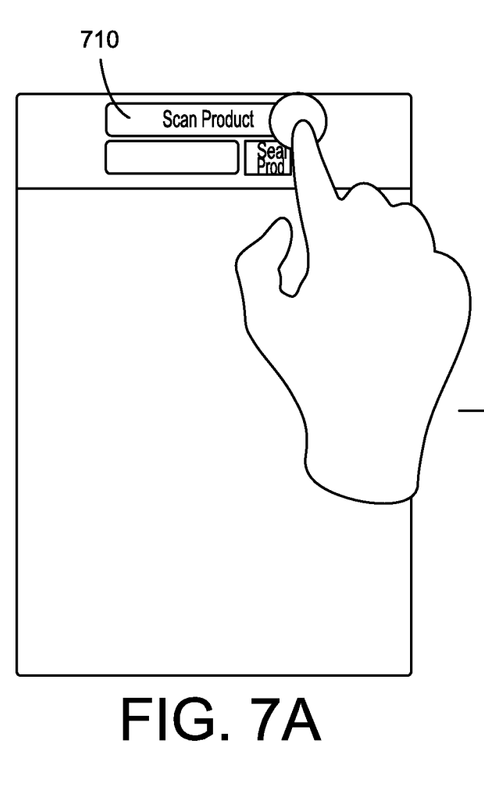
FIG. 7 shows a user using the mobile application to scan a universal product code in order to determine whether any available coupons exist for that product.
Figure 7B:
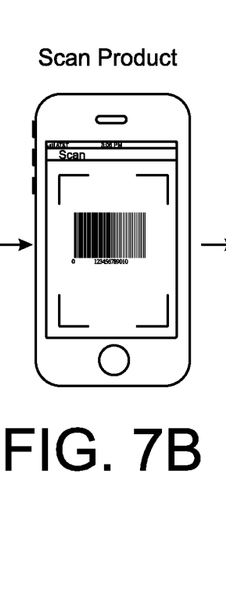
Figures 7C, 7D, 7E:
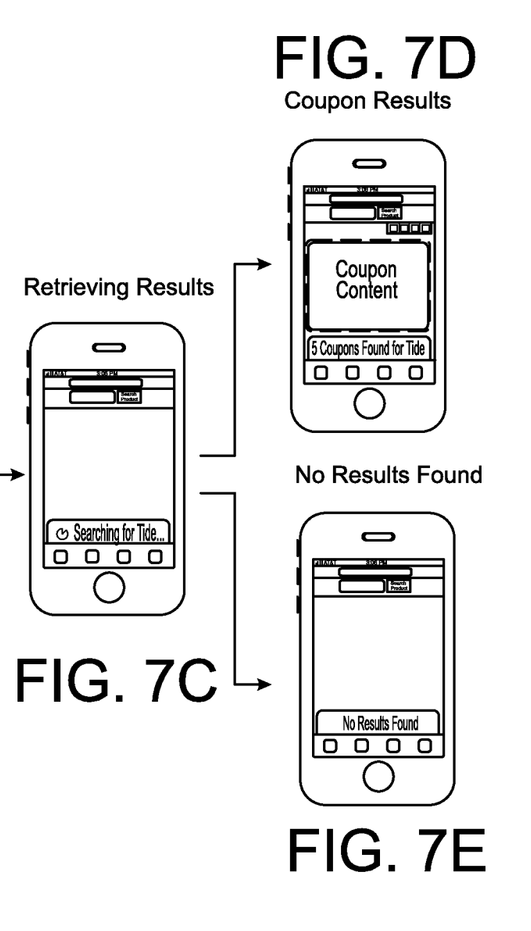

FIGS. 7A-7E depict the mobile application being used to scan a universal product code. The user selects the "Scan Product" button 710 in FIG. 7A which activates the mobile device's camera for scanning a universal product code. The user scans the product code in FIG. 7B, and the application will then search for coupons for that product and any similar products as shown in FIG. 7C. The application then returns the results for viewing by the user in FIG. 7D. If no coupons are identified, the application will tell the user that no results were found, as depicted in FIG. 7E.

Figure 8A:
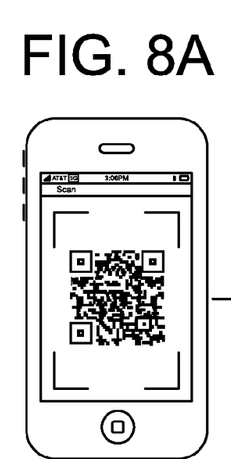
FIG. 8 depicts a flowchart showing further detail of how the mobile application scans universal product codes to identify coupons and deliver same to a user.
Figure 8B:
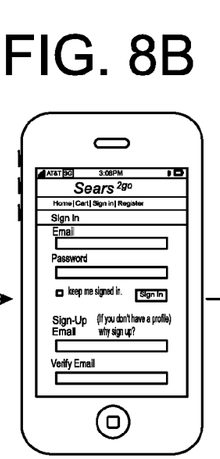
Figure 8C:
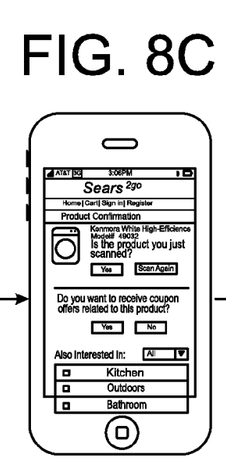
Figure 8D:
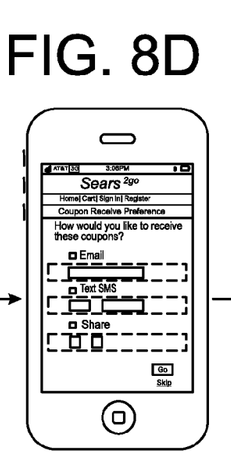
Figure 8E:
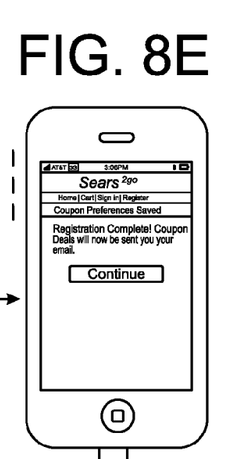
Figure 8F:
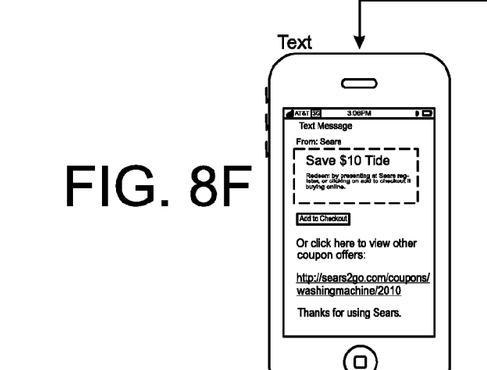
Figure 8G:
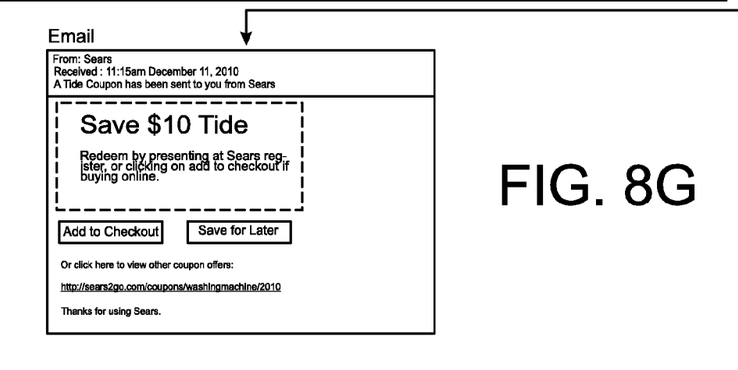

FIGS. 8A-8G collectively show a flowchart which depicts further detail of how universal product codes may be scanned to identify coupons, and how a user can set his or her preferences regarding how those coupons will be delivered to a user. In FIG. 8A, a user scans a product code, and the user is then prompted in FIG. 8B to log in or sign up to enable the features of the coupon service application. Next, a confirmation is displayed is FIG. 8C, asking the user to confirm which product was scanned. The user is then prompted to provide his or her preferences for how coupons will be received in FIG. 8D, including through email, text/SMS, or shared on social media sites, including Facebook and Twitter. Finally, in FIG. 8E, the application shows that the user's coupon preferences have been saved. Per the user's preferences, coupons are then delivered to the user—FIG. 8F for text message/SMS, and FIG. 8G for email.

Figures 9A, 9B:
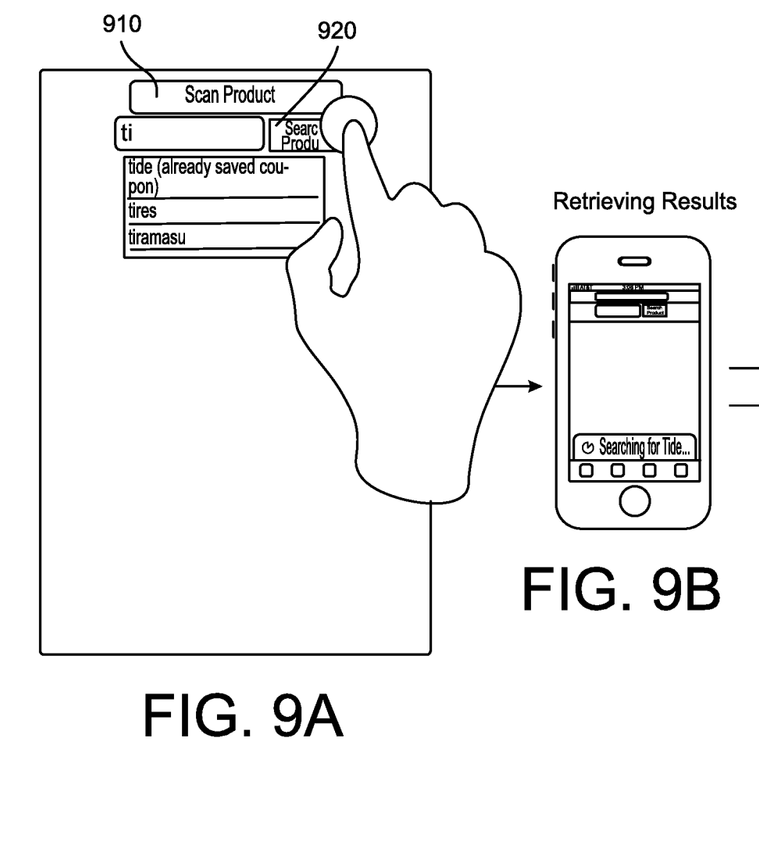
FIG. 9 shows a user using the mobile application to search for available coupons exist for a given product.
Figure 9C:
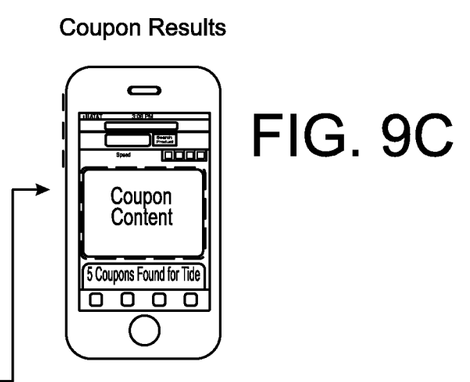
Figure 9D:
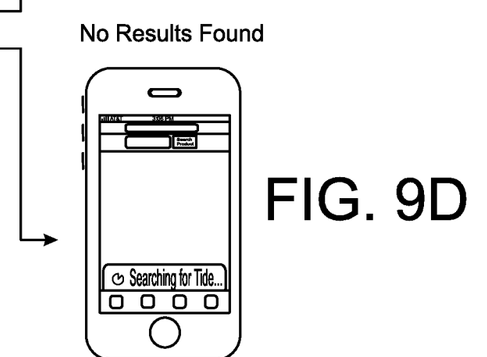

FIGS. 9A-9D shows a user utilizing the text search aspect of the mobile application, which allows users to identify coupons by brand or product name. FIG. 9A shows a user entering the name of the product in the text box 910 and selects the "Search Products" button 920. The application will then search for coupons, as depicted in FIG. 9B, for that product and any similar products, and return the results for viewing by the user, as shown in FIG. 9C. If no coupons are identified, the application will tell the user that no results were found, as depicted in FIG. 9E.

Figure 10A:
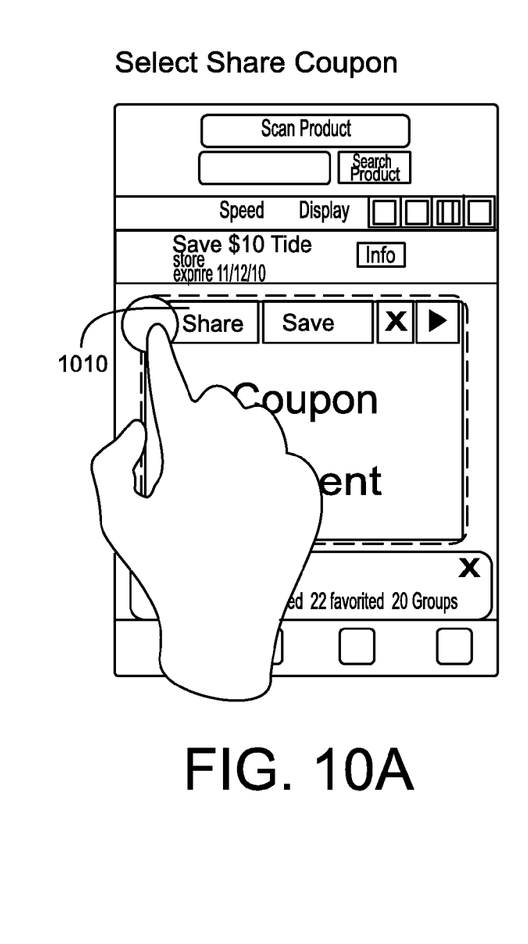
FIG. 10 depicts a user using the mobile application to share a coupon with other users via social media, email, or directly between mobile applications.
Figures 10B, 10C:
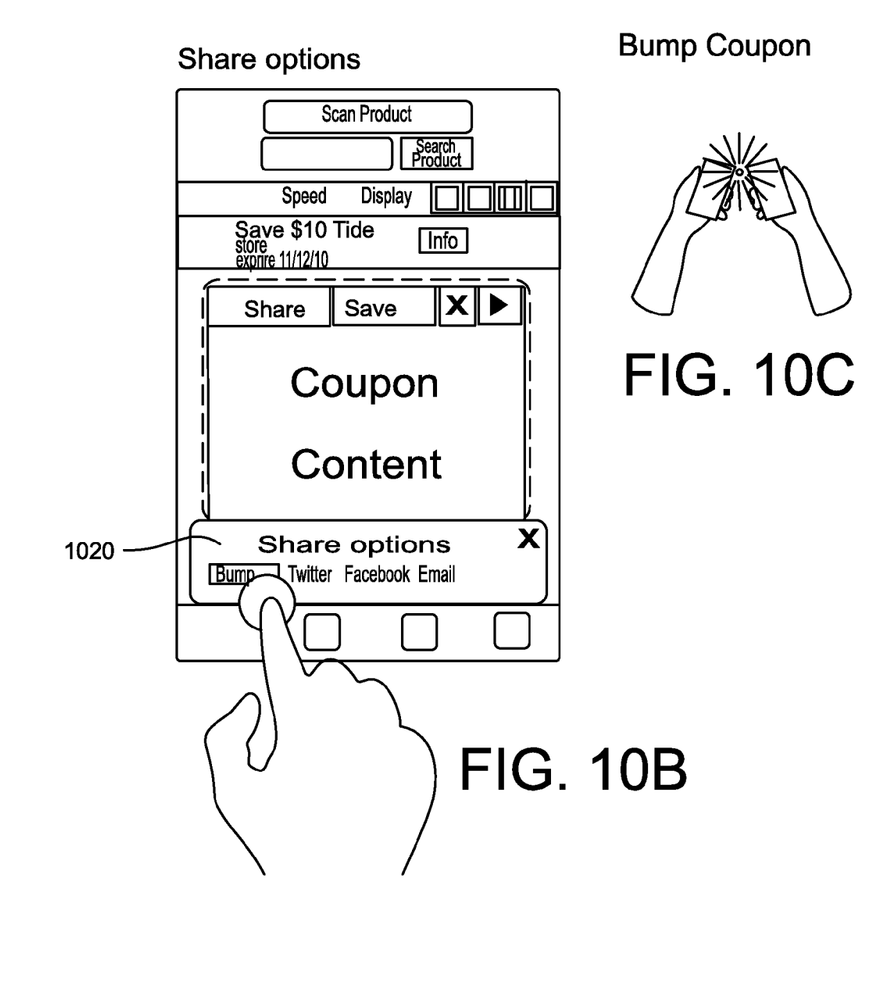

Referring to FIGS. 10A-10C, a user can share coupons through the mobile application by selecting the "Share" button 1010. A set of "Share options" 1020 then appears, as shown in FIG. 10B, enabling users to share the coupon via text/SMS, social media, or directly between mobile devices, through "bumping" the two mobile devices. FIG. 10C depicts two users "bumping" two mobile devices to share the coupons as described herein.

Figure 11A:
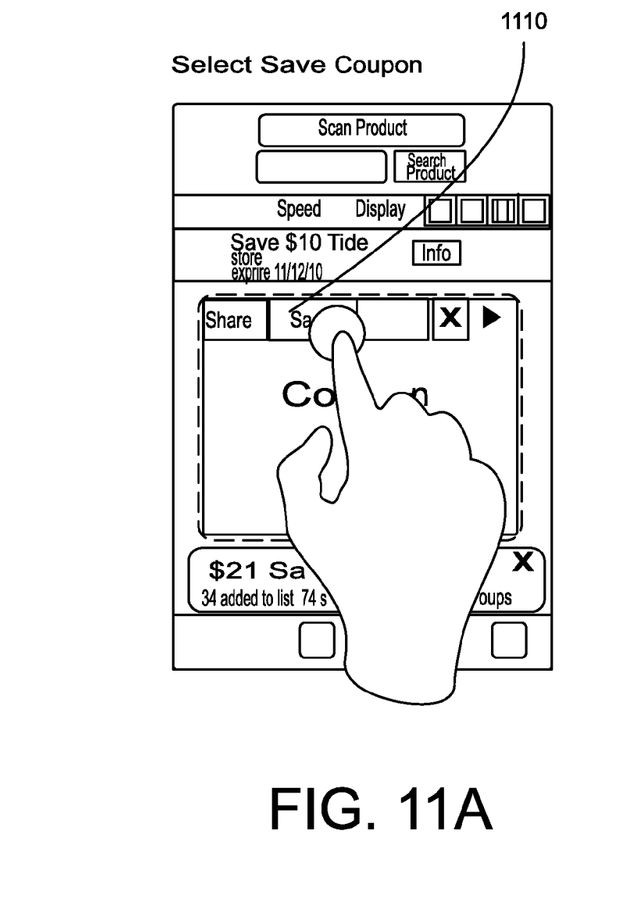
FIG. 11 shows a user saving a coupon within the mobile application for later use.
Figure 11B:
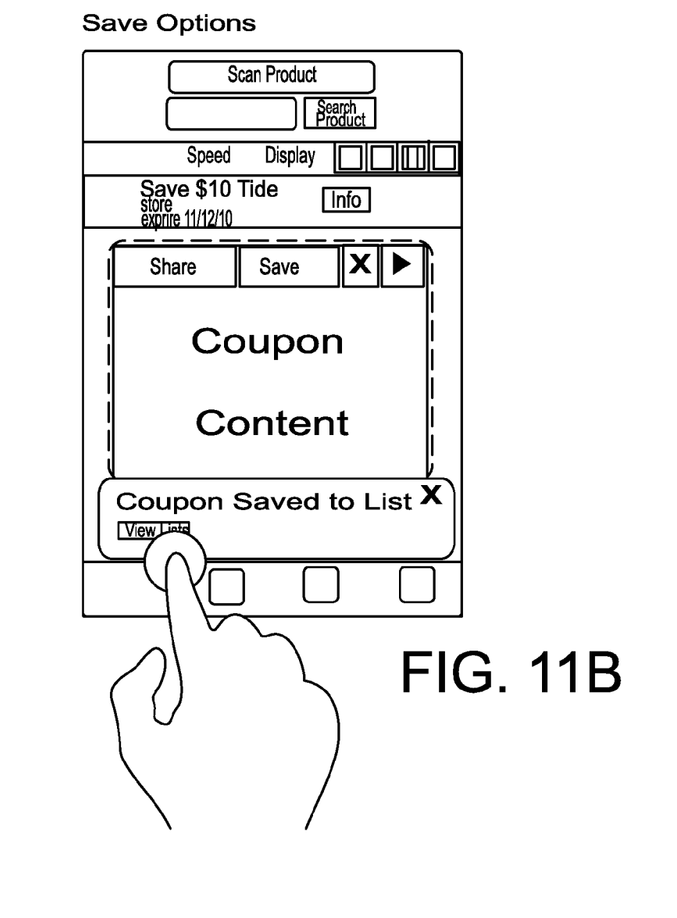

FIGS. 11A-11B depict the mobile application being used to save a coupon to a user's book of saved coupons. The user selects the "Save" button 1110, which saves the coupon and enables the user to view lists of various coupons.

Although certain example methods and apparatus have been described herein, the scope of coverage of this patent is not limited thereto. On the-contrary, this patent covers all methods, apparatus, and articles of manufacture fairly falling within the scope of the appended claims either literally or under the doctrine of equivalents.

We claim:

1. A non-transitory computer-readable medium having stored thereon computer executable instructions which, when executed by a processing device, perform steps for identifying coupons, comprising:

monitoring a refrigerator via a device manager, wherein the device manager provides user access to a first list that includes grocery items inside the refrigerator, wherein the device manager receives status information concerning the grocery items inside the refrigerator, wherein the status information includes information relating to a quantity of one or more grocery items inside the refrigerator;

receiving a first user input defining a particular grocery item;

generating a shopping list based on the first list, the received first user input, and the status information;

comparing the shopping list against a coupon database;

identifying one or more available coupons for the first product;

outputting the identified one or more available coupons via a graphic display;

receiving a second user input defining a strike price;

monitoring the price of the particular grocery item; and providing an alert when the price of the particular grocery item equals or falls below the strike price.

2. The computer-readable medium according to claim 1, wherein the first user input is received through a touchscreen.

3. The computer-readable medium according to claim 1, wherein the first user input is received via voice recognition.

4. The computer-readable medium according to claim 1, wherein the first user input comprises a scan of a universal product code (UPC).

5. The computer-readable medium according to claim 1, wherein the generating step comprises the step of syncing the shopping list with an online user wish list on a retail website.

6. The computer-readable medium according to claim 1, wherein the refrigerator provides an inventory based on the first list of the grocery items inside the refrigerator.

7. The computer-readable medium according to claim 1, wherein the shopping list is updated by adding or replacing an item from a user preferred list of items.

8. A non-transitory computer-readable medium having stored thereon computer executable instructions which, when executed by a processing device, perform steps for identifying a coupon, comprising:

monitoring and controlling one or more home appliances via a device manager, wherein the device manager provides user access to a first list that includes one or more items inside the one or more home appliances, wherein the device manager receives status information concerning the one or more items inside the one or more home appliances, wherein the status information includes information relating to one or more of a quantity, a purchase date, and a purchase price of the one or more items inside the one or more home appliances;

receiving a first user input defining a first item;

generating a home inventory based on the first list, the received first user input, and the status information;

comparing the home inventory against a coupon database;

identifying one or more available coupons for any item in the home inventory;

outputting the identified one or more available coupons via a graphic display;

receiving a second user input defining a strike price;

monitoring the price of the first item; and providing an alerting when the price of the first item equals or falls below the strike price.

9. The computer-readable medium according to claim 8, wherein the instructions enable users to organize the home inventory by a number of categories.

10. The computer-readable medium according to claim 9, wherein the first user input is received via voice recognition.

11. The computer-readable medium according to claim 9, wherein the first user input comprises a scan of a universal product code.

12. The computer-readable medium according to claim 8, wherein the instructions further perform steps, comprising:

monitoring a current price of the first item;

maintaining a price log for the first item; and calculating an average price of the first item based on the price log.

13. The computer-readable medium according to claim 8, wherein the instructions further perform steps comprising:

allowing a user to select a coupon from a set of available coupons; and enabling the user to share the coupon through one or more of a text message and a multimedia message.

14. The computer-readable medium according to claim 8, wherein the instructions further perform steps comprising:

allowing a user to select a coupon from a set of available coupons; and enabling the user to share the coupon through social media.

15. The computer-readable medium according to claim 8, wherein the instructions further perform steps comprising:

allowing a user to select a coupon from a set of available coupons; and enabling the user to share the coupon directly between mobile devices.

16. The computer-readable medium according to claim 8, wherein the instructions further perform steps comprising:

monitoring, via a cellular communications network, a status of the one or more items inside the one or more home appliances; and providing a shopping list based on the monitored status of the one or more items.

17. A non-transitory computer-readable medium having stored thereon computer executable instructions which, when executed by a processing device, perform steps for identifying a coupon, comprising:

monitoring and controlling one or more home appliances via a device manager, wherein the device manager provides user access to a first list that includes one or more items inside the one or more home appliance, wherein the device manager receives status information concerning the one or more items inside the one or more home appliances;

receiving a first user input defining a first item;

generating a home inventory based on the first list, the received first user input, and the status information;

comparing the home inventory against a coupon database;

identifying one or more available coupons for any item in the home inventory;

outputting the identified one or more available coupons;

receiving a second user input defining whether the first item is tax deductible;

updating a tax deductible inventory list based on the second user input; and syncing the tax deductible inventory list with a software application for tax preparation.

18. The computer-readable medium according to claim 17, wherein the instructions further perform steps comprising:

receiving a third user input defining a strike price;

monitoring a price of the first item; and providing an alert when the price of the first item equals or falls below the strike price.

19. A non-transitory computer-readable medium having stored thereon computer executable instructions which, when executed by a processing device, perform steps for identifying coupons, comprising:

monitoring a home appliance via a cellular communication network, wherein the monitoring includes accessing a first list that includes one or more items housed by the home appliance, wherein the device manager receives status information concerning the one or more items housed by the home appliance;

receiving an input from the home appliance defining a first item;

generating a second list based on the first list, the received input, and the status information;

comparing the second list against a coupon database;

identifying one or more available coupons for the first item;

outputting the one or more identified available coupons via a graphic display;

receiving a second user input defining a strike price;

monitoring a price of the first item; and providing an alert when the price of the first item equals or falls below the strike price.

20. The computer-readable medium according to claim 19, comprising:

receiving a third user input from a mobile cellular device, wherein the third user input defines a second item; and updating the second list based on the first list, the received input from the home appliance, the status information, and the third user input from the mobile cellular device.

* * * * *